Oct. 12, 1948.  C. J. KEIM  2,450,895
STUFFING BOX

Filed May 22, 1946  3 Sheets-Sheet 1

Inventor:
CHARLES J. KEIM,
by: Donald G. Dalton
his Attorney

Oct. 12, 1948.  C. J. KEIM  2,450,895
STUFFING BOX
Filed May 22, 1946   3 Sheets-Sheet 2
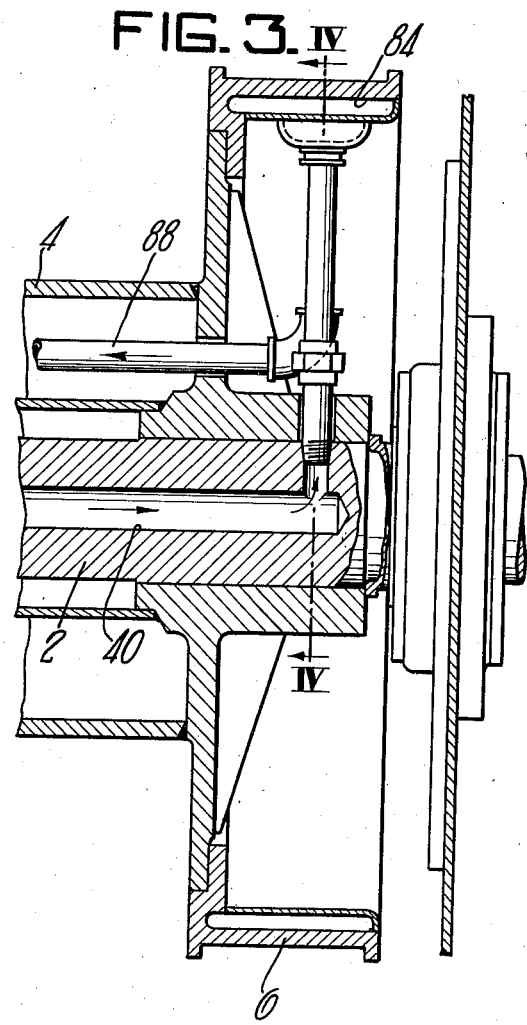
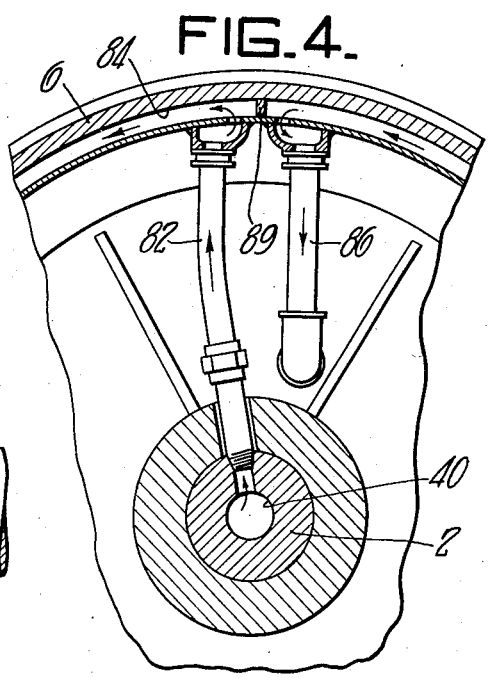
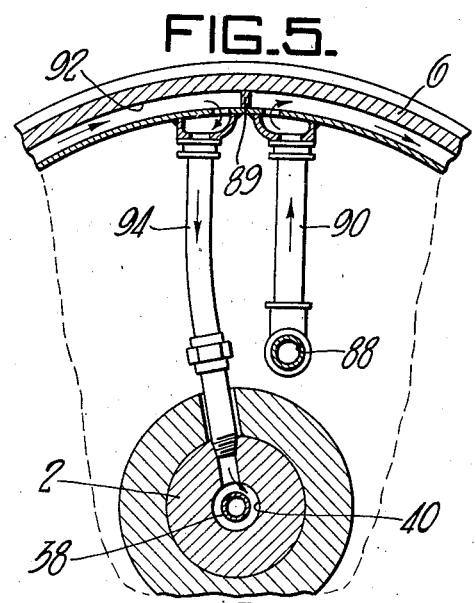
Inventor:
CHARLES J. KEIM,
by Donald G. Dalton
his Attorney.

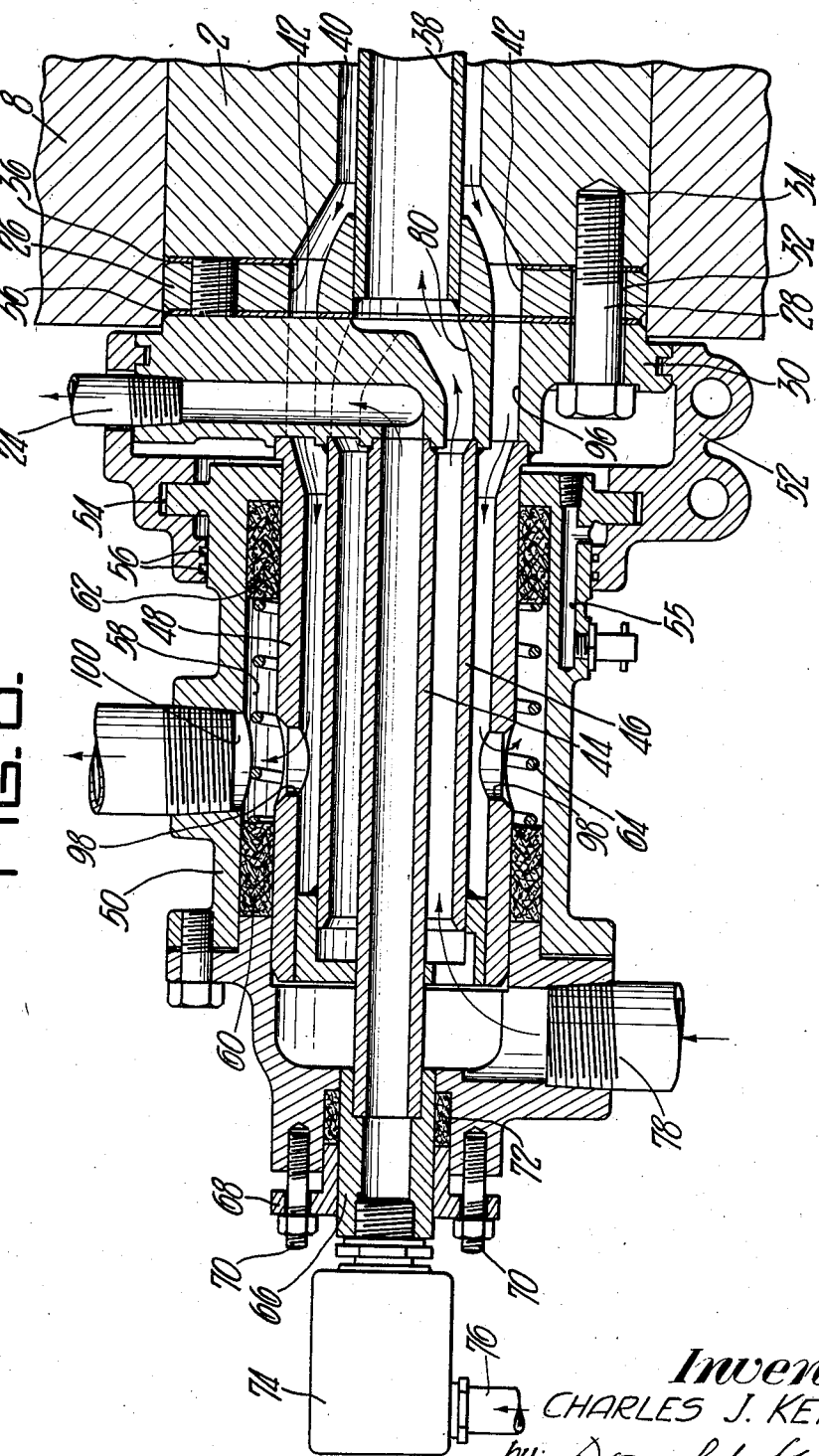

Patented Oct. 12, 1948

2,450,895

UNITED STATES PATENT OFFICE 2,450,895

STUFFING BOX

Charles J. Keim, Oil City, Pa., assignor to Oil Well Supply Company, a corporation of New Jersey Application May 22, 1946, Serial No. 671,535

11 Claims. (Cl. 285—96.3)

This invention relates to a stuffing box and more particularly to an air and water stuffing box for use on the drum shaft of a hoist. In all oil field hoists or drawworks for heavy duty drilling below 5,000 feet, it is desirable to provide water cooled brake flanges for the hoisting unit to prevent overheating of the brakes under heavy loads which cause a large amount of wear on the brake flanges and lining, thus requiring frequent replacement of the parts. The most convenient arrangement for cooling the brake flanges is to introduce water through drilled passages in the end of the drum shaft, and circulate it through jackets on the inner surfaces of the brake flanges.

Air clutches are commonly used on the drum shaft of modern hoists or drawworks which necessitates the introduction of compressed air to the drum shaft for actuating the clutches. When an air clutch is located on each end of the drum shaft and water cooled brake flanges are used, it is necessary to provide an air inlet as well as a water inlet and outlet at one end of the drum shaft. This requires a stuffing box arrangement with three separate passages, each of which must be sealed against the other.

It is an object of my invention to provide a multiple stuffing box for use with a drum shaft assembly.

This and other objects will be more apparent after referring to the following specification and attached drawings, in which:

Figure 3 is a cross sectional view of the brake drum at the right hand end of the drum shaft;

Figure 4 is a sectional view taken on the line IV—IV of Figure 3;

Figure 5 is a sectional view taken on the line V—V of Figure 2; and

Figure 6 is a sectional view of the stuffing box.

Figure 1:
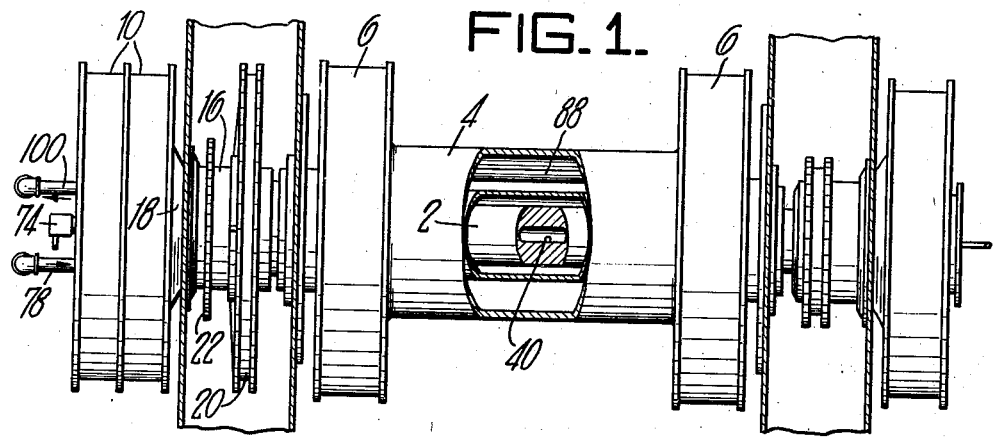
Figure 1 is a view, partly in cross section, of the drum of a hoist.
Figure 2:
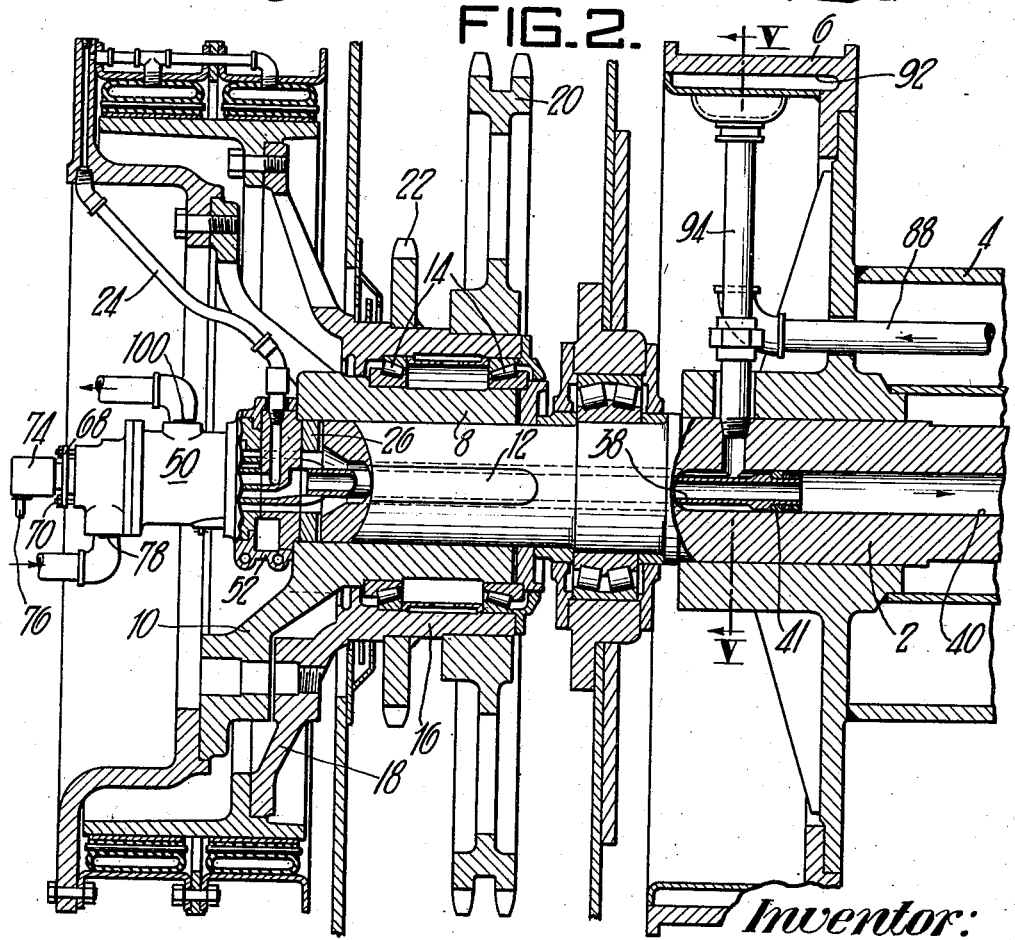
Figure 2 is a cross sectional view of the left hand end of the drum shaft.

Referring more particularly to the drawings, the reference numeral 2 indicates the drum shaft of a hoist having a drum 4 mounted thereon for rotation therewith. A water cooled brake flange 6 is provided at each end of the drum 4 with water being applied thereto from the left hand end of the shaft. The hub 8 of the outer portion 10 of an air clutch is fastened to the left hand end of the shaft 2 by means of a key 12. Rotatably mounted on the hub 8 on anti-friction bearings 14 is the hub 16 of the inner portion 18 of the clutch. Mounted on the hub 16 for rotation therewith are the sprockets 20 and 22. When air is introduced through the conduit 24 to the clutch, the inner and outer portions of the clutch become engaged so that rotation of sprocket 20 will be transmitted to the shaft 2. Rotation of sprocket 22 is transmitted to the hoist line shaft (not shown) by means of a chain (also not shown). Air is introduced into conduit 24 from the left hand end of the shaft 2. A similar clutch is provided at the right hand end of shaft 2 with the air therefor being introduced through the right hand end of the shaft.

As shown in Figure 6, a round disc 26 is clamped to the left hand end of shaft 2 by means of screws 28 which pass through holes in a flange 30 and through holes 32 in disc 26 into tapped holes 34 in the end of shaft 2. Gaskets 36 are provided on each side of disc 26 to effect a satisfactory seal. A water inlet tube 38 is welded to the disc 26 and extends into a bore 40 in the shaft 2. The bore 40 is of greater diameter than the outside diameter of tube 38 to provide a passageway for the warm water coming from the left hand brake drum 6. The tube 38 terminates adjacent the left hand brake flange 6 and packing 41 is provided between the outside of tube 38 and bore 40 to separate the left and right hand ends of bore 40. Passageways 42 are provided in the disc 26 to permit passage of the warm water from the bore 40. Welded to the outer side of flange 30 are three concentric tubes 44, 46 and 48. The parts 30, 44, 46 and 48 form a spindle having three passages therethrough, the passages being sealed from one another. If desired, the spindle could be cast or otherwise formed in one piece. Surrounding the tube 48 is a stuffing box housing 50 which is held in place by a split clamping yoke 52 fastened to the flange 30. A tongue and groove joint 54, acting as a thrust collar, is provided between the housing 50 and yoke 52 to prevent the stuffing box housing from being forced off the spindle by fluid pressure and from moving axially in either direction. Provision is made for lubrication of the thrust collar 54 through passage 55 with annular grooves 56 in the clamping yoke 52 to retain the lubricant. The housing 50 is spaced from the tube 48 to provide a space 58 therebetween. Packing rings 60 and 62 are provided at each end of space 58 and are kept under compression by means of the spring 64 which surrounds the tube 48 and extends between the packing rings 60 and 62. A coupling 66 is fastened to the outer end of tube 44. A packing gland 68 surrounds the coupling 66 and is fastened to the housing 50 by means of screws 70. Packing 72 is held in place between the coupling 66 and housing 50 under adjusted pressure by the gland 68. Air is introduced into the air conduit 24 through the tube 44 and the coupling 66 to the outer end of which is fastened a rotary seal 74 of the type disclosed in Browne Patent No. 2,270,928, dated January 27, 1942. Air is delivered to the rotary seal 74 from a compressor or reservoir through an air line 76.

Water is circulated through the brake flanges 6 as follows: From an inlet conduit 78 in the stationary housing 50, the water passes between the tubes 44 and 46, through a passage 80 in the flange 30, through the tube 38 and bore 40, from where it flows radially through a tube 82 to the cooling chamber 84 in the right hand brake flange 6. The water, after passing around the brake flange is discharged therefrom through a tube 86 which leads to a tube 88 extending to the left hand brake flange 6. A plate 89 between the inlet and outlet of chamber 84 prevents short circuiting of the cooling water. The water passes from tube 88 through a conduit 90 to the cooling chamber 92 of the left hand brake flange. The water after passing around the brake flange is discharged therefrom through the conduit 94 to the annular passage 60, from where it passes through passage 96, tube 48, and openings 98 in the tube 48, to a discharge outlet 100 in the housing 50. By circulating the coolant in this manner, the centrifugal force developed by the spindle rotation tends to assist circulation and reduces the pressure drop through the system. If desired, the circulation of cooling water could be reversed by having the water enter at 100 and discharge from conduit 78.

While one embodiment of my invention has been shown and described, it will be apparent that other adaptations and modifications may be made without departing from the scope of the following claims.

I claim:

1. A stuffing box assembly comprising a rotatable shaft, said shaft having two fluid passageways therein, a spindle fastened to the end of said shaft for rotation therewith, said spindle having three fluid passages therein extending outwardly from the end of said shaft, a stuffing box housing surrounding said spindle, means for connecting said housing to said spindle, a packing gland fastened to the end of said housing, the first of said passages passing through said packing gland, a fluid conduit in said housing extending to the outside thereof and communicating with the second passage, said second passage communicating with one of said fluid passageways, and a second fluid conduit in said housing extending to the outside thereof and communicating with the third passage, said third passage communicating with the second fluid passageway.

2. A stuffing box assembly comprising a rotatable shaft, said shaft having two fluid passageways therein one within the other, a spindle fastened to the end of said shaft for rotation therewith, said spindle having three fluid passages therein one within the other extending outwardly from the end of said shaft, a stuffing box housing surrounding said spindle, means for connecting said housing to said spindle, a packing gland fastened to the end of said housing, the inner of said passages passing through said packing gland, a fluid conduit in said housing extending to the outside thereof and communicating with the middle passage, said second passage communicating with the inner fluid passageway, and a second fluid conduit in said housing extending to the outside thereof and communicating with the outer passage, said third passage communicating with the second fluid passageway.

3. A stuffing box assembly comprising a rotatable shaft, said shaft having two fluid passageways therein, a member fastened to the end of said shaft for rotation therewith, three tubes fastened to said member and extending outwardly therefrom, a stuffing box housing surrounding said tubes, means for connecting said housing to said member, a packing gland fastened to the end of said housing, the first of said tubes passing through said packing gland, said member having an opening therein communicating with said first tube, a fluid conduit in said housing extending to the outside thereof and communicating with the second of said tubes, said member having an opening therein extending between the second tube and one of said fluid passageways, and a second fluid conduit in said housing extending to the outside thereof and communicating with the third of said tubes, said member having an opening therein extending between the third tube and the second of said fluid passageways.

4. A stuffing box assembly comprising a rotatable shaft, said shaft having two fluid passageways therein one within the other, a member fastened to the end of said shaft for rotation therewith, three tubes fastened to said member and extending outwardly therefrom one within the others, a stuffing box housing surrounding said tubes, means for connecting said housing to said member, a packing gland fastened to the end of said housing, the inner of said tubes passing through said packing gland, said member having an opening therein communicating with the inner tube, a fluid conduit in said housing extending to the outside thereof and communicating with the middle tube, said member having an opening therein etxending between the middle tube and the inner fluid passageway, and a second fluid conduit in said housing extending to the outside thereof and communicating with the outer of said tubes, said member having an opening therein extending between the outer tube and the outer fluid passageway.

5. A stuffing box assembly comprising a rotatable shaft, said shaft having two fluid passageways therein one within the other, a member fastened to the end of said shaft for rotation therewith, three tubes fastened to said member and extending outwardly therefrom one within the others, a stuffing box housing surrounding said tubes, means for connecting said housing to said member, a packing gland fastened to the end of said housing, the inner of said tubes passing through said packing gland, said member having an opening therein communicating with the inner tube, a fluid conduit in said housing extending to the outside thereof and communicating with the middle tube, said member having an opening therein extending between the middle tube and the inner fluid passageway, a second fluid conduit in said housing extending to the outside thereof and communicating with the outer of said tubes, said member having an opening therein extending between the outer tube and the outer fluid passageway, said outer tube being spaced from said housing to provide a space therebetween, and packing in said last named space.

6. A stuffing box assembly comprising a rotatable shaft, said shaft having an axial opening therein, a disc at one end of said shaft, a tube fastened to said disc and extending into said opening, the outer diameter of said tube being less than the diameter of said opening to provide a fluid passage therebetween, a second disc adjacent the outer side of said first disc, the inner face of said second disc being spaced from the end of said shaft, said shaft having tapped holes in the end thereof, said discs having aligned openings therein, screws extending through said aligned openings into said tapped holes to fasten the discs to said shaft, a stuffing box housing adjacent said second disc, and means for connecting said housing to said disc.

7. A stuffing box assembly comprising a rotatable shaft, said shaft having an axial opening therein, a disc at one end of said shaft, a tube fastened to said disc and extending into said opening, the outer diameter of said tube being less than the diameter of said opening to provide a fluid passage therebetween, a second disc adjacent the outer side of said first disc, said shaft having tapped holes in the end thereof, said discs having aligned openings therein, screws extending through said aligned openings into said tapped holes to fasten the discs to said shaft, a stuffing box housing adjacent said second disc, a clamping yoke surrounding said second disc and fastened thereto, and a thrust collar connection between said yoke and housing.

8. A stuffing box assembly comprising a rotatable shaft, said shaft having an axial opening therein, a disc at one end of said shaft, a tube fastened to said disc and extending into said opening, the outer diameter of said tube being less than the diameter of said opening to provide a fluid passage therebetween, a second disc adjacent the outer side of said first disc, said shaft having tapped holes in the end thereof, said discs having aligned openings therein, screws extending through said aligned openings into said tapped holes to fasten the discs to said shaft, said second disc having three concentric tubes fastened thereto and extending outwardly therefrom, a stuffing box housing surrounding the outer of said concentric tubes, and means for connecting said housing to said disc.

9. A stuffing box assembly comprising a rotatable shaft, said shaft having an axial opening therein, a disc at one end of said shaft, a tube fastened to said disc and extending into said opening, the outer diameter of said tube being less than the diameter of said opening to provide a fluid passage therebetween, a second disc adjacent the outer side of said first disc, said shaft having tapped holes in the end thereof, said discs having aligned openings therein, screws extending through said aligned openings into said tapped holes to fasten the discs to said shaft, said second disc having three concentric tubes fastened thereto and extending outwardly therefrom, each of said tubes being sealed from the other tubes, a clamping yoke surrounding said second disc and fastened thereto, a stuffing box housing surrounding the outer of said concentric tubes, means for connecting said housing to said yoke, a packing gland fastened to the end of said housing, the inner of said concentric tubes passing through said packing gland, said second disc having a radial opening therein communicating with said inner tube, a fluid conduit in said housing extending to the outside thereof and connected to the middle of said concentric tubes, said discs having openings therein extending between the middle tube and the first mentioned tube, said discs having openings therein extending between the outer tube and the bore of said shaft, and a fluid conduit in said housing extending to the outside thereof and connecting with the outer tube.

10. A stuffing box assembly comprising a rotatable shaft, said shaft having an axial opening therein, a disc at one end of said shaft, a tube fastened to said disc and extending into said opening, the outer diameter of said tube being less than the diameter of said opening to provide a fluid passage therebetween, a second disc adjacent the outer side of said first disc, said shaft having tapped holes in the end thereof, said discs having aligned openings therein, screws extending through said aligned openings into said tapped holes to fasten the discs to said shaft, said second disc having three concentric tubes fastened thereto and extending outwardly therefrom, each of said tubes being sealed from the other tubes, a clamping yoke surrounding said second disc and fastened thereto, a stuffing box housing surrounding the outer of said concentric tubes, a thrust collar connection between said yoke and housing, a packing gland fastened to the end of said housing, the inner of said concentric tubes passing through said packing gland, said second disc having a radial opening therein communicating with said inner tube, a fluid conduit in said housing extending to the outside thereof and connected to the middle of said concentric tubes, said discs having openings therein extending between the middle tube and the first mentioned tube, said discs having openings therein extending between the outer tube and the bore of said shaft, and a fluid conduit in said housing extending to the outside thereof and connecting with the outer tube.

11. A stuffing box assembly comprising a rotatable shaft, said shaft having an axial opening therein, a disc at one end of said shaft, a tube fastened to said disc and extending into said opening, the outer diameter of said tube being less than the diameter of said opening to provide a fluid passage therebetween, a second disc adjacent the outer side of said first disc, said shaft having tapped holes in the end thereof, said discs having aligned openings therein, screws extending through said aligned openings into said tapped holes to fasten the discs to said shaft, said second disc having three concentric tubes fastened thereto and extending outwardly therefrom, each of said tubes being sealed from the other tubes, a clamping yoke surrounding said second disc and fastened thereto, a stuffing box housing surrounding the outer of said concentric tubes, a tongue and groove connection between said yoke and housing, a packing gland fastened to the end of said housing, the inner of said concentric tubes passing through said packing gland, said second disc having a radial opening therein communicating with said inner tube, a fluid conduit in said housing extending to the outside thereof and connected to the middle of said concentric tubes, said discs having openings therein extending between the middle tube and the first mentioned tube, said discs having openings therein extending between the outer tube and the bore of said shaft, a fluid conduit in said housing extending to the outside thereof and connecting with the outer tube, said outer tube being spaced from said housing to provide a space therebetween, and packing in said last named space.

CHARLES J. KEIM.

REFERENCES CITED

The following references are of record in the file of this patent:

UNITED STATES PATENTS

| Number | Name | Date |
|---|---|---|
| 462,145 | Leach | Oct. 27, 1891 |
| 1,924,216 | Smith et al. | Aug. 29, 1933 |
| 2,402,224 | Hornbostel | June 18, 1946 |
| 2,413,645 | Nygren | Dec. 31, 1946 |

FOREIGN PATENTS

| Number | Country | Date |
|---|---|---|
| 518,218 | Great Britain | 1940 |